US010247359B2

(12) United States Patent
Tseng et al.

(10) Patent No.: US 10,247,359 B2
(45) Date of Patent: Apr. 2, 2019

(54) LIQUEFIED NATURAL GAS TRANSPORTATION/DISTRIBUTION AND VAPORIZATION MANAGEMENT SYSTEM

(71) Applicant: ELECTRIC ENERGY EXPRESS CORPORATION, Hsinchu County (TW)

(72) Inventors: Ling-Yuan Tseng, Hsinchu (TW); Tze Tzung Chen, Taipei (TW); Shun-Yu Wang, Hsinchu (TW); Mingfu Chu, Taitung County (TW)

(73) Assignee: Electric Energy Express Corporation, Zubei (TW)

( * ) Notice: Subject to any disclaimer, the term of this patent is extended or adjusted under 35 U.S.C. 154(b) by 862 days.

(21) Appl. No.: 14/861,078

(22) Filed: Sep. 22, 2015

(65) Prior Publication Data

US 2016/0265723 A1 Sep. 15, 2016

(30) Foreign Application Priority Data

Mar. 11, 2015 (TW) ............................ 104107787 A

(51) Int. Cl.
*F17C 7/04* (2006.01)
*F17C 9/02* (2006.01)
(Continued)

(52) U.S. Cl.
CPC ...................................... *F17C 7/04* (2013.01)

(58) Field of Classification Search
CPC .. H01M 8/04059; H01M 8/06; H01M 8/0606; H01M 8/0612; H01M 8/0618;
(Continued)

(56) References Cited

U.S. PATENT DOCUMENTS 8,636,174 B1 * 1/2014 Motkowski .......... B67D 1/1295 222/1
2007/0012050 A1 * 1/2007 Brown ...................... F17C 7/04 62/50.2

(Continued)

FOREIGN PATENT DOCUMENTS

CN 104160130 A 11/2014
GB 2437446 A * 10/2007 .............. F17C 5/007

(Continued)

*Primary Examiner* — Frantz F Jules
*Assistant Examiner* — Erik Mendoza-Wilkenfel
(74) *Attorney, Agent, or Firm* — Rosenberg, Klein & Lee

(57) ABSTRACT

A liquefied natural gas transportation/distribution and vaporization management system includes a transportation/distribution platform, on which at least one gas transportation/distribution section, a vaporization treatment section, and a central management section are arranged. The gas transportation/distribution section allows at least one liquefied natural gas train to unload liquefied natural gas. The vaporization treatment section is connected to the gas transportation/distribution section. The vaporization treatment section includes therein at least one fuel cell module, so that heat exchange may be conducted with byproduct of thermal energy and water generated in a power generation operation of the fuel cell module to vaporize liquefied natural gas from the gas transportation/distribution section and to feed the vaporized natural gas into a local area gas supply pipeline or a temporary gas storage section for storage and for feeding to the fuel cell module of the vaporization treatment section. The central management section receives the electrical power generated by the fuel cell module of the vaporization treatment section and is connected to and controls transportation/distribution and vaporization of the liquefied natural gas and management, monitor, and control of the output of the vaporized liquefied natural gas of the gas transportation/distribution section and the vaporization treatment section.

17 Claims, 9 Drawing Sheets

(51) Int. Cl.
*H01M 8/04* (2016.01)
*H01M 8/06* (2016.01)

(58) Field of Classification Search
CPC .............. H01M 2008/1293; F17C 7/04; F17C 2270/0134; F17C 2270/0136; F17C 2270/0139; F17C 9/02
See application file for complete search history.

(56) References Cited

U.S. PATENT DOCUMENTS

| | | | | |
|---|---|---|---|---|
| 2009/0038242 | A1* | 2/2009 | Cope | B65G 47/18 52/192 |
| 2014/0093800 | A1* | 4/2014 | Sato | C01B 3/384 429/425 |
| 2014/0167694 | A1* | 6/2014 | Gjinali | B60L 11/1824 320/109 |
| 2014/0245779 | A1* | 9/2014 | Bohra | F25J 1/0015 62/611 |
| 2014/0302410 | A1* | 10/2014 | Iyengar | B01D 53/62 429/411 |

FOREIGN PATENT DOCUMENTS

| | | | |
|---|---|---|---|
| JP | 2014-532833 | 12/2014 | |
| TW | 197466 | 1/1993 | |
| TW | 489198 | 6/2002 | |
| TW | 568863 | 1/2004 | |
| WO | WO 2007030500 A2 * | 3/2007 | B01B 1/005 |

* cited by examiner

LIQUEFIED NATURAL GAS TRANSPORTATION/DISTRIBUTION AND VAPORIZATION MANAGEMENT SYSTEM

BACKGROUND OF THE INVENTION

1. Field of the Invention

The present invention relates to a liquefied natural gas (LNG) transportation/distribution and vaporization management system, and in particular to a system that allows a transportation/distribution platform to transport/distribute and manage liquefied natural gas and a fuel cell module for vaporization of the liquefied natural gas and supply of natural gas.

2. The Related Arts

The resources of natural gas are one of the clean power generation fuels and energies that have been widely discussed throughout the whole world. Particularly, the natural gas can be generally completely combusted and the amount of the byproduct of carbon dioxide emitted is far less than the amount of carbon dioxide generated by a thermal power generation system based on energy from coals, making it a clean and environmentally friendly way of power generation and supply of energy that has been actively developed by countries around the world. Further, natural gas is also the primary energy for cooking and supplying of hot water for families. Thus, natural gas is an indispensable supply of energy for power generation and fuel resources for daily living and as such, the transportation/distribution, vaporization, and management of natural gas are of vital importance.

The primary transportation vehicle for transportation of liquefied natural gas is specifically constructed liquefied natural gas transportation vessels. The liquefied natural gas, after unloaded at a specific harbor, must be filled into a large storage tank built on an area of the harbor or constructed underground. An early-day liquefied natural gas transportation vessel may ship liquefied natural gas of a volume of around 120,000-140,000 $m^3$ (approximately 50 thousand tons), which must be filled into a temporary storage tank of a large capacity of 100-200 thousand kiloliter, so that to supply natural gas, a complicated process of vaporization is applied to allow the vaporized gas to be pressurized and supplied through an extended length of natural gas supply pipeline to a large storage tank of a local gas company. The gas company then distributes, through gas distribution pipelines, the natural gas to resident users or downstream users. There are three known and commonly used ways of vaporization, of which the first one is ambient air vaporization (AAV), where air temperature of the surroundings is used to exchange heat with liquefied natural gas for vaporization. However, although the air temperature in for example a subtropic area or a tropic area may be above 0° C. (for example the average summer temperature of Taiwan being around 25° C. and the average winter temperature being around 15° C.), the temperature of liquefied natural gas is as low as −165° C., and this makes the efficiency of vaporization in this way very poor and rate of vaporization is low and is readily susceptible to environmental factors, such as temperatures of different seasons, temperature difference between daytime and nighttime, wind directions, and humidity, all these making the efficiency of vaporization even poorer. In addition, in the process of such a way of vaporization, sites adjacent to an inlet port of liquefied natural gas and heat exchange plates for vaporization may readily get frozen, which negatively affects the efficiency and rate of vaporization. Further, powerful fans must be installed to generate airflows of large amounts of air for such a way of vaporization. In addition to the installation expenditure, a large amount of electrical power must be consumed and an increased surface area is needed for a workshop operating such a way of vaporization. This is adverse to industrial utilization and economic value.

The second way of vaporization is open rack vaporization, where sea water from the sea where a liquefied natural gas unloading harbor is used and supplied to a heat exchanger for spraying so that the temperature of the sea water is used to achieve heat exchange for vaporization of liquefied natural gas. Similarly, although the average temperature of the sea water must be at least 5° C., it is readily affected by the environment and weather of the local area. Further, after heat exchange with the liquefied natural gas, the sea water must have a temperature that keeps the temperature difference between ingress and egress within a range of 5° C. according to most local regulations of environmental protection. Direct discharge of the sea water back to the sea would cause a severe impact on the marine creatures and ecology of the local sea area, this being not an operation mode acceptable for environmental protection. Further, such a process of using sea water as a heat exchange medium requires the sea water to be filtered first in order to remove impurities or oil contamination from the sea water, otherwise the sea water may readily get frozen in the heat exchanger. This makes the operation and installation costs high and also requires a large area of workshop for such an operation, making it adverse to industrial utilization and economic value.

The third way of vaporization is intermediate fluid vaporization, where liquids of other types of hydrocarbon compounds are used as a medium for a first stage of heat exchange with liquefied natural gas and sea water that is heated is used as a medium for a second stage of heat exchange. Although this is effective in improving the problem of sea water getting frozen in a process of vaporization through spraying the sea water, the two-stage process of heat exchange for vaporization requires complicated operations and more labor and time cost. In addition, hydrocarbon compound liquids, such as propane ($C_3H_8$) or butane ($C_4H_{10}$), must be pressurized and this requires additional consumption of electrical power and installation cost. Further, since sea water is used as a medium for heat exchange, the same issues of impurity of sea water and environmental protection of impact to marine creatures and ecology caused by variation of sea water temperature exist.

All the known ways of vaporization of liquefied natural gas discussed above suffer different problems and drawbacks. The process of transportation and vaporization of liquefied natural gas must be conducted in the specific harbor unloading area or a large storage tank and then the natural gas is supplied through an extended length of a supply pipeline to a local gas company or a plurality of gas tank trucks having a capacity of 10-15 tons is used to transport the natural gas, through a long way of surface roads, to downstream users. In addition to the high cost of transportation and distribution, the efficiency of transportation through the gas tank trucks is susceptible to influence caused by road conditions and weather. The elongated vaporization and poor transportation efficiency of liquefied natural gas may cause insufficient supply or delayed supply to the downstream users. In other words, vaporization may not be achieved timely to supply natural gas to the local gas company and the downstream users. Thus, the distribution of natural gas through a long process based on harbor unloading area or a large storage tank to an upstream supply pipeline to the local gas company makes it not possible to timely and flexibly supply natural gas and also requires an extremely large area of workshop, as well as a great amount of human labor for operation, monitoring, and management, making adverse to automatic management of workshop and facility. In addition, when the upstream gas supply pipeline is shut down due to for example damage and leaking, the supply of natural to the downstream gas company and users is affected. This causes undesired problems and drawbacks of transportation and distribution of natural gas.

Prior art patent documents are known. For example, Taiwan Patent No. 568863 discloses a liquefied natural gas vaporization technique that, similar to the prior art discussed above, uses sea water for vaporization, where a vessel cooling device (2), an underwater heat exchanger (21), and a vaporization device (23) made of a super stainless steel that are partly immersed in sea water to achieve vaporization of the liquefied natural gas carried in a transportation vessel. The same problems as those of the second and third ways of vaporization discussed above where sea water or sea water plus a fluid medium are used for vaporization exist. In addition, the vessel cooling device (2), the underwater heat exchanger (21), and the vaporization device (23) must be better treated for rusting protection or made of a better material. This increases the installation cost. Further, the transpiration and distribution of natural gas suffer the same problems as the third way of vaporization of being incapable of timely and flexibly supplying to the downstream users. In addition, the operation of vaporization covers a large range and thus, a large amount of human labor is needed for operation and monitoring. The operation area is hard to effectively managed and controlled.

Also, Taiwan Patent No. 489198 discloses a typical method and technique for vaporization of liquefied natural gas by using sea water to conduct heat exchange, which suffers the same problems and drawbacks of the conventional open rack vaporization of the second way discussed above. In addition, such a solution of transportation and distribution of liquefied natural gas is based on large-sized vessels and similarly, it is not possible to provide transportation/distribution and vaporization/supply of natural gas in a timely and flexible manner to the downstream gas companies and users.

Further, Taiwan Patent No. 197466 discloses vaporization and liquefied natural gas and power generation by using a gas turbine (GT), a pump (P1), four sets of heat exchangers (E1), (E2), (E3), and (E4), a complicated system of pipelines (1), (2a), (2b), (2c), (2d), (3a), and (3b), and an expansion turbine (X1). Such a structure of vaporization of liquefied natural gas is extremely complicated so that the cost is high and a large area of workshop is necessary, making it hard to manage and monitor. Again, it is not possible to build up at any desired location. Such a solution of transportation and distribution of liquefied natural gas still suffers the above-discussed problems of being not possible for timely and flexible vaporization and supply of natural gas and management being hard and requiring extra manpower. In addition, such a solution requires repeated pressurization and depressurization during vaporization through heating by using circulating water so that there is a great loss of thermal energy during the transmission thereof, whereby the heat-electricity conversion efficiency of the expansion turbine (X1) for power generation is very poor. In other words, the performance of power generation is poor, making it simply for embellishment and not possible to supply electrical power for the operation of the workshop. In addition, the solution requires a large amount of circulation of water for heat exchange and thus, the vaporization and power generation workshop must be built up in a site where a large supply of water is accessible, making it not possible to be constructed in a remote area where the supply of water and electricity is lacking or insufficient.

Further, Chinese Patent Publication No. CN104160130 and Japanese Patent Publication No. 2014-532833 disclose a solution using liquefied carbon dioxide ($CO_2$) to serve as a primary medium for a liquefied natural gas vaporization system and a turbine generator (3) is involved, where a power turbine (2) and a liquefied $CO_2$ pump (5) are operable to feed a combustion product flow (6) and a cooling $CO_2$ recirculation flow (22) to generate electrical power. Similarly, the solution of the patent documents is a complicated structure of vaporization of liquefied natural gas and power generation, requiring a high cost of installation and occupying a large area of a workshop, so that it cannot be built up in any desired location and needs a large amount of manpower for operation, monitoring, and management, making it adverse to automatic management of workshop and facility. Such a solution of transportation and distribution of liquefied natural gas still suffers the problems and drawbacks of being not possible for timely and flexible vaporization and supply of natural gas. Again, the liquefied carbon dioxide flow and the fuel product flow involved in the solution of these patent documents are generally not materials allowing for repeated re-use for environmental protection. Leaking of such material would cause severe environmental pollution and damage to conservation of the environment, making it not possible for industrial uses in a large scale and being only available for specific industrial users, so that the use thereof is limited.

SUMMARY OF THE INVENTION

The object of the present invention is to provide a liquefied natural gas transportation/distribution and vaporization management system, which eliminates the problems and drawbacks of the known techniques and method of transportation/distribution and vaporization of liquefied natural gas and the techniques and methods of transportation/distribution and vaporization disclosed in the previously discussed patent documents that gas cannot be timely and flexibly supplied to a local gas company or downstream users and that a workshop requires a relatively large area and must be built up in a specific area and requires complicated and expensive facility and also requires a large amount of human labor for operation, monitoring, and management and is thus adverse for automation and management of the workshop.

Thus, the present invention provides a liquefied natural gas transportation/distribution and vaporization management system, which comprises:

a transportation/distribution platform;

at least one gas transportation/distribution section, which is arranged on at least one side of the transportation/distribution platform that is close to a railway adapted to allow at least one liquefied natural gas transportation train to unload liquefied natural gas;

at least one vaporization treatment section, which is arranged on the transportation/distribution platform and is connected to the gas transportation/distribution section to receive the liquefied natural gas, the vaporization treatment section comprising at least one fuel cell module and at least one heat exchange tank, the fuel cell module comprising at least one byproduct outlet for a byproduct of thermal energy or water, a fuel inlet, and an electrical power output terminal, the at least one byproduct outlet of thermal energy or water being connected to the heat exchange tank, the heat exchange tank comprising therein at least one exchange pipeline, the exchange pipeline having an end connected to and receiving the liquefied natural gas from the gas transportation/distribution section for heat exchange with the at least one byproduct of thermal energy or water generated in a power generation operation of the fuel cell module so as to generate vaporized liquefied natural gas, an out-feed pipeline being formed at an opposite end of the exchange pipeline to output the vaporized liquefied natural gas, a portion of the vaporized liquefied natural gas outputted from the out-feed pipeline being fed back to the fuel inlet of the fuel cell module; and at least one central management section, which is arranged on the transportation/distribution platform and is connected to and receive electrical power from the electrical power output terminal of the fuel cell module of the vaporization treatment section and is connected to and controls transportation/distribution, vaporization of the liquefied natural gas and management, monitor, and control of temporary storage of vaporized natural of the gas transportation/distribution section, the vaporization treatment section, and a temporary gas storage section.

In the above liquefied natural gas transportation/distribution and vaporization management system, the gas transportation/distribution section comprises a liquefied natural gas pump arranged therein. The liquefied natural gas pump is connected to the central management section to be activated and controlled by the central management section to supply assistance to input of the liquefied natural gas.

In the above liquefied natural gas transportation/distribution and vaporization management system, the gas transportation/distribution section comprises a liquefied natural gas leak sensor arranged therein. The liquefied natural gas leak sensor is connected to the central management section to feed leak detection status of the liquefied natural gas of the gas transportation/distribution section back to the central management section.

In the above liquefied natural gas transportation/distribution and vaporization management system, the fuel cell module of the vaporization treatment section comprises a solid oxide fuel cell (SOFC) module.

In the above liquefied natural gas transportation/distribution and vaporization management system, at least one air blower is arranged and connected between the byproduct outlet of thermal energy of the fuel cell module of the vaporization treatment section and the heat exchange tank. The air blower is controlled and activated by the central management section to generate hot air that is fed into the heat exchange tank.

In the above liquefied natural gas transportation/distribution and vaporization management system, the byproduct outlet of thermal energy of the fuel cell module of the vaporization treatment section comprises at least one gas valve. The gas valve is controlled by the central management section for opening/closing to control communication with outside atmosphere.

In the above liquefied natural gas transportation/distribution and vaporization management system, at least one hot water tank is arranged and connected between the byproduct outlet or water of the fuel cell of the vaporization treatment section and the heat exchange tank. The hot water tank comprises at least one electrical heater arranged therein. The electrical heater is connected to the central management section to be controlled and activated by the central management section to generate hot water in the hot water tank for supplying to the heat exchange tank. The heat exchange tank comprises a water sprayer arranged therein. The water sprayer sprays the hot water from the hot water tank onto a surface of the exchange pipeline of the heat exchange tank.

In the above liquefied natural gas transportation/distribution and vaporization management system, at least one circulation pump is arranged and connected between the hot water tank of the vaporization treatment section and the heat exchange tank. The circulation pump is controlled and activated by the central management section to generate circulation of hot water supplied to the heat exchange tank.

In the above liquefied natural gas transportation/distribution and vaporization management system, the hot water tank of the vaporization treatment section comprises at least one temperature sensor arranged therein. The temperature sensor is connected to the central management section to feed water temperature of the hot water tank back to the central management section.

In the above liquefied natural gas transportation/distribution and vaporization management system, the heat exchange tank of the vaporization treatment section comprises a gas exchange outlet for achieving exchange with outside cold air.

In the above liquefied natural gas transportation/distribution and vaporization management system, the out-feed pipeline of one end of the exchange pipeline of the heat exchange tank of the vaporization treatment section is connected to a first control valve. A second control valve is arranged and connected between the first control valve and the fuel inlet of fuel cell module of the vaporization treatment section. The first control valve and the second control valve are controlled by the central management section to control feeding of the vaporized liquefied natural gas to the fuel cell module.

In the above liquefied natural gas transportation/distribution and vaporization management system, the second control valve is connected to an activation tank.

In the above liquefied natural gas transportation/distribution and vaporization management system, the first control valve has an output terminal that is connected to a pressure sensor. The pressure sensor is connected to the central management section to feed a detection status of pressure of the vaporized liquefied natural gas supplied from the output terminal of the first control valve back to the central management section.

In the above liquefied natural gas transportation/distribution and vaporization management system, the out-feed pipeline of one end of the exchange pipeline of the heat exchange tank of the vaporization treatment section is connected to at least one temporary gas storage section.

In the above liquefied natural gas transportation/distribution and vaporization management system, the out-feed pipeline of one end of the exchange pipeline of the heat exchange tank of the vaporization treatment section is connected to at least one local area gas supply pipeline.

In the above liquefied natural gas transportation/distribution and vaporization management system, an ancillary electrical heating device is arranged at a bottom of the heat exchange tank of the vaporization treatment section. The ancillary electrical heating device is connected to the central management section to be controlled and activated by the central management section to supply thermal energy for assisting heating to the heat exchange tank.

In the above liquefied natural gas transportation/distribution and vaporization management system, the central management section comprises:

at least one detection unit, which is connected to and detects statuses of input and vaporization of the liquefied natural gas supplied to the gas transportation/distribution section and the vaporization treatment section and leaking of output, vaporization temperature, water level, and pressure of the vaporized liquefied natural gas;

at least one central processing unit, which is connected to the detection unit to receive signals and data of the detection statuses of input and vaporization of the liquefied natural gas supplied to the gas transportation/distribution section and the vaporization treatment section and leaking of output, vaporization temperature, water level, and pressure of the vaporized liquefied natural gas and to supply, in response to the signals and data of the detection statuses, control instructions and safety alarm signals corresponding to input and vaporization of the liquefied natural gas supplied to the gas transportation/distribution section and the vaporization treatment section and leaking of output, vaporization temperature, water level, and pressure of the vaporized liquefied natural gas;

at least one output control interface, which is connected to the central processing unit and is connected to the gas transportation/distribution section and the vaporization treatment section to receive the control instructions supplied from the central processing unit and corresponding to input and vaporization of the liquefied natural gas supplied to the gas transportation/distribution section and the vaporization treatment section and leaking of output, vaporization temperature, water level, and pressure of the vaporized liquefied natural gas associated with the gas transportation/distribution section and the vaporization treatment section and to supply corresponding operation control signals to the gas transportation/distribution section and the vaporization treatment section;

at least one communication interface, which is connected to the central processing unit to transmit, via a wired or wireless communication mode, the signals and data of the detection statuses of input and vaporization of the liquefied natural gas supplied to the gas transportation/distribution section and the vaporization treatment section and leaking of output, vaporization temperature, water level, and pressure of the vaporized liquefied natural gas and the operation statuses and the safety alarm signals of input and vaporization of the liquefied natural gas supplied to the gas transportation/distribution section and the vaporization treatment section and leaking of output, vaporization temperature, water level, and pressure of the vaporized liquefied natural gas to at least one remote monitor and control center; and at least one electrical power conversion unit, which is connected to the electrical power output terminal of the fuel cell module of the vaporization treatment section to receive and convert electrical power supplied from the electrical power output terminal into operation powers necessary for the detection unit, the central processing unit, the output control interface, and the communication interface in order to supply the operation powers to the detection unit, the central processing unit, the output control interface, and the communication interface.

In the above liquefied natural gas transportation/distribution and vaporization management system, the central processing unit is connected to a safety alarm unit to supply the safety alarm signals to the safety alarm unit for issuing a near-site safety alarm.

The efficacy of the liquefied natural gas transportation/distribution and vaporization management system of the present invention is that a liquefied natural gas transportation/distribution and vaporization management system made up of a gas transportation/distribution section, a vaporization treatment section, and a central management section, which is simple and has a reduced installation area and low cost is provided for easy integration and arrangement on a transportation/distribution platform for freight unloading of a railway that has a limited area and space, allowing for the installation of the present invention in a nearby railway station for directly conducting a vaporization treatment and transportation/distribution in a flexible way through the railway so that a large number of easily operable and low cost liquefied natural gas transportation/distribution and vaporization management systems can be installed and transportation efficiency is not affected by road conditions or severe weather, and no occupation of a large area is needed. At least one byproduct of thermal energy or water generated in a power generation operation of a fuel cell module of the vaporization treatment section and the primarily generated electrical power can be used to vaporize liquefied natural gas in a continuous and inexpensive manner through a simple and circulative heat exchange operation system of thermal energy and water composed of a hot water tank and a heat exchanger in order to output vaporized natural gas, without additional arrangement and installation of additional resources of supply of water and electrical power and thermal energy, to thereby provide a self-supporting independent workshop, being not constrained by access to resources of land, weather, water, heat, making it particularly suitable for remote areas and areas where natural gas pipelines and electrical power networks are not built up, such as a far mountain area, a small village, or remote areas, or an area where the supply of water, electricity, and thermal energy is sufficient but close to a small railway station. Electrical power supplied from the electrical power output terminal of the fuel cell module of the vaporization treatment section, which in addition to being used to support the operation the system of the present invention, may serve as an assisting backup power supply or an uninterrupted power supply for the railway station and neighboring communities or for charging electrical vehicles. The byproduct of thermal energy or water of the fuel cell module, in addition to being used support the vaporization treatment of the system of the present invention, can be supplied as a backup water supply and warming or heating energy for the transportation/distribution platform or the railway station. The central management section provides automatic detection, monitoring and control of the gas transportation/distribution section and the vaporization treatment section so as to allow a near-site operator or a gas company at a remote site to monitor and control or to get aware of the transportation/distribution of the liquefied natural gas through the railway, vaporization, and output of natural gas, as well as safety alarm status. The out-feed pipeline of the vaporization treatment section may be connected to a local area gas supply pipeline supplied to communities in the neighborhood of the railway station, the user residents, or a canister filling workshop or to be supplied to a temporary gas storage section for temporary storage. Compared to the prior art devices/arrangements discussed above, the present invention offers great saving of transportation and distribution and reduction of vaporization cost and generates no pollution and damage to the environment and no safety concern, so as to be a paragon model of re-use of railway station land and energy distribution and management for environmentally friendly and safe use of liquefied natural gas.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
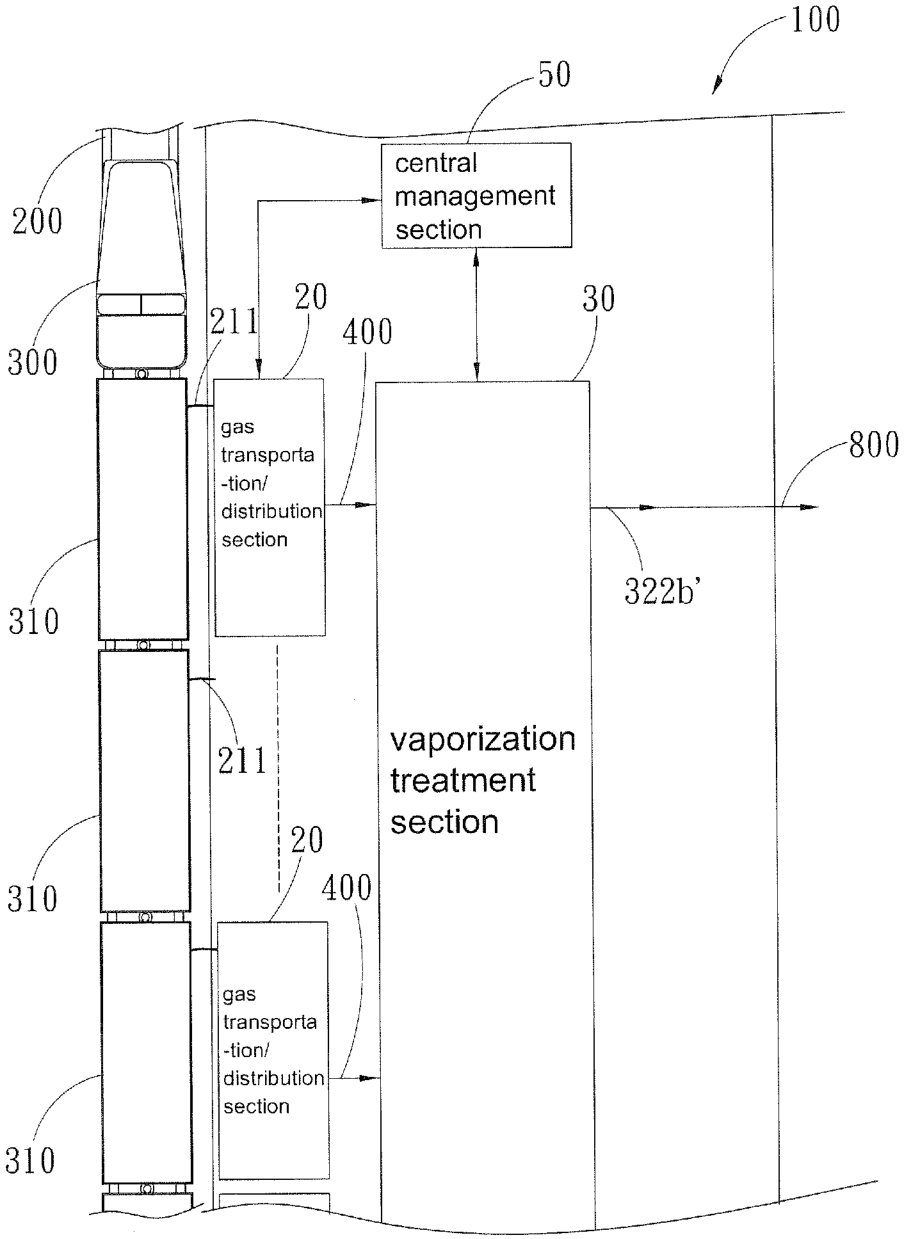
FIG. 1 is a schematic view of a liquefied natural gas transportation/distribution and vaporization management system according to the present invention.
Figure 2:
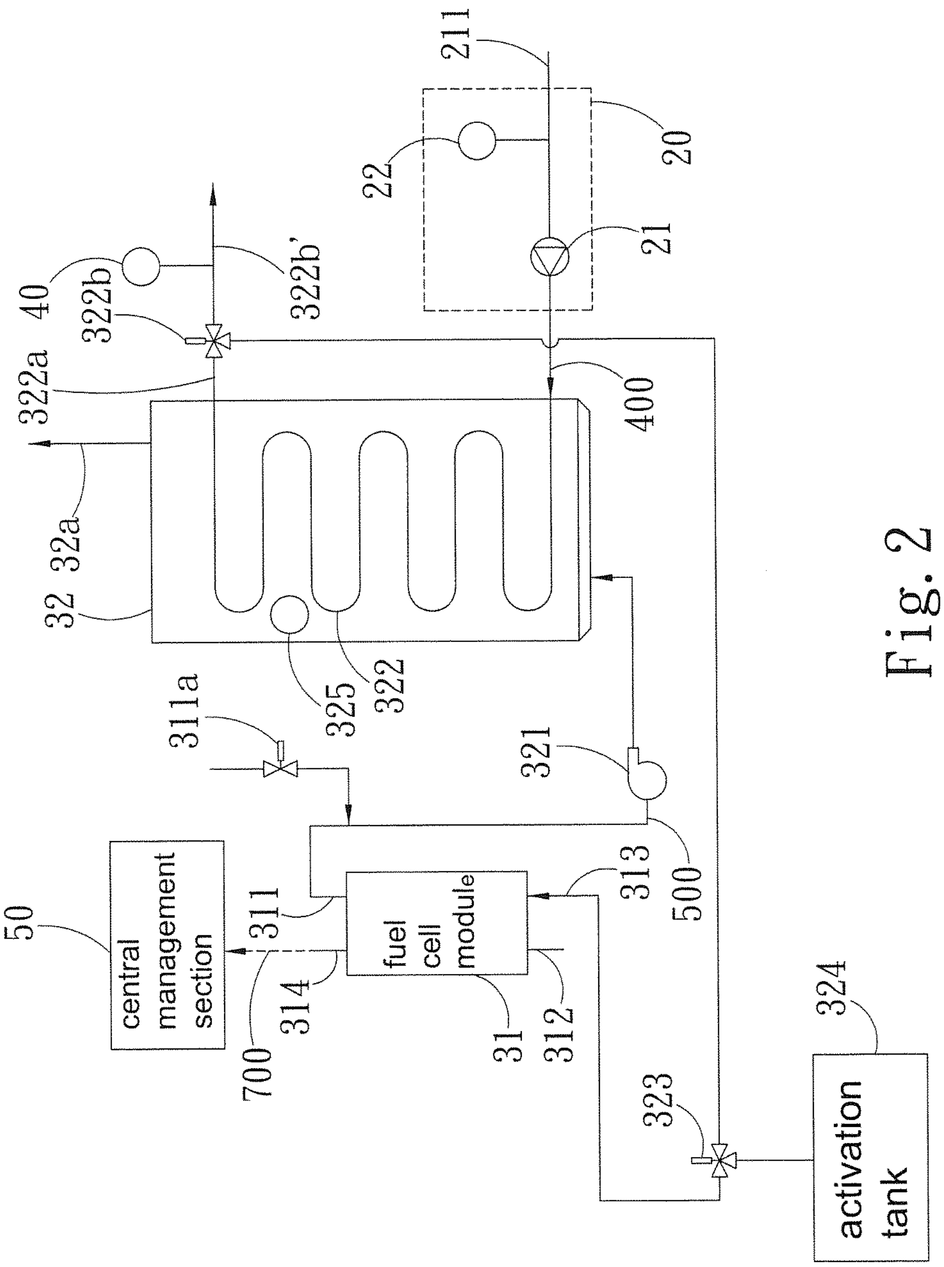
FIG. 2 is a block diagram of a first embodiment of the liquefied natural gas transportation/distribution and vaporization management system according to the present invention.
Figure 3:
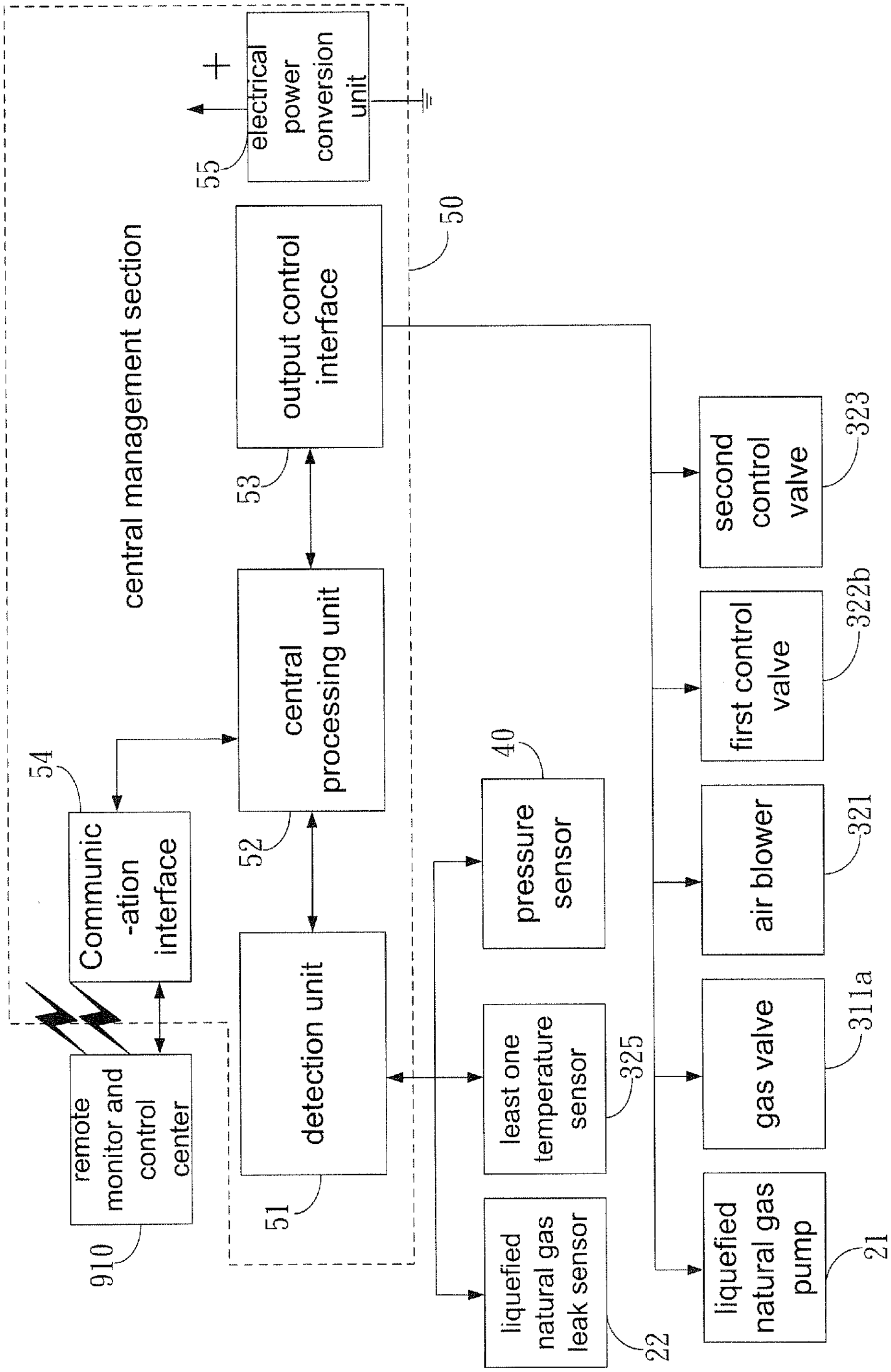
FIG. 3 is a block diagram of a central management section of the liquefied natural gas transportation/distribution and vaporization management system according to the present invention.

With reference to the drawings and in particular to FIGS. 1, 2, and 3, a liquefied natural gas transportation/distribution and vaporization management system 100 according to a first embodiment of the present invention is shown. The transportation/distribution and vaporization management system 100 comprises a transportation/distribution platform 10, which can be a freight platform of a railway train station, a railway platform, or a disused platform. In other words, the platform can be any railway platform except a passenger platform.

At least one gas transportation/distribution section 20 is arranged in the transportation/distribution platform 10 at one side thereof that is close to a railway 200 to allow at least one liquefied natural gas transportation train 300 to stop on the railway 200 to load/unload and transport liquefied natural gas 400. Liquefied natural gas 400 can be methane ($CH_4$), propane, or butane in liquid form. The liquefied natural gas transportation train 300 drives a plurality of liquefied natural gas flat/tank cars 310. Each of the liquefied natural gas flat/tank cars 310 carries and transports around 25-50 tons of liquefied natural gas 400 for loading/unloading liquefied natural gas 400 at each of multiple stations. The gas transportation/distribution section 20 comprises a liquefied natural gas pump 21 and a liquefied natural gas leak sensor 22. The liquefied natural gas pump 21 is connectable via an in-feed pipeline 211 to at least one of the liquefied natural gas flat/tank cars 310 of the liquefied natural gas transportation train 300 to unload and/or feed liquefied natural gas 400. The liquefied natural gas leak sensor 22 is connected to the in-feed pipeline 211 to detect leaking of liquefied natural gas 400 during unloading/feeding from/into the liquefied natural gas flat/tank cars 310 of the liquefied natural gas transportation train 300 and to issue and give off a leak detection signal.

At least one vaporization treatment section 30 is arranged on the transportation/distribution platform 10 and is connected to the liquefied natural gas pump 21 of the gas transportation/distribution section 10 to receive liquefied natural gas 400. The vaporization treatment section 30 comprises at least one fuel cell module 31 and at least one heat exchange tank 32. The fuel cell module comprises at least one byproduct outlet 311, 312, a fuel inlet 313, and an electrical power output terminal 314. The byproduct outlet 311 outputs a byproduct of thermal energy 500 in the form of a hot gas. The byproduct outlet 312 outputs a byproduct of water 600. The electrical power output terminal 314 outputs electrical power 700 produced through power generation of the fuel cell module, wherein the electrical power 700 can be in the form of an alternating current. The fuel cell module 31 is not limited to any specific form and type and in the present invention, a solid oxide fuel cell module of model BlueGen available from an Australian company, Ceramic Fuel Cells Limited (CFCL), is used as an example, wherein the fuel inlet 313 receives a fuel of methane as an example of liquefied natural gas 400. During a process of power generation of the fuel cell module 31, the byproduct outlet 311 outputs thermal energy 500 that can be as high as 0.35-0.42 kilowatts (or 360 kilocalorie/kilowatt hour). The byproduct outlet 312 outputs water 600 that can be at least 300 gram/kilowatt hour). The electrical power output terminal 314 outputs electrical power 700 that is in the form of an alternating current of 110/220V, 60 Hz and has a fuel-electricity conversion rate as high as 60%. In other words, a supply of a cubic meter ($m^3$) fuel of natural gas would allow the electrical power output terminal 314 to supply 6 kilowatt hours of electrical power 700, plus the thermal energy 500 supplied from the byproduct outlet 311 and the water 600 supplied from the byproduct outlet 312 that exhibit a byproduct conversion rate of around 25%, making the overall energy conversion rate of the fuel cell module 31 as high as around 85%.

At least one of the byproduct outlets 311, 312 of thermal energy 500 and water 600 is connected to the heat exchange tank 32. In the first embodiment of the present invention, the byproduct outlet 311 of thermal energy 500 is connected to the heat exchange tank 32, wherein the byproduct outlet 311 is provided with at least one gas valve 311*a* to control communication thereof with outside atmosphere. The gas valve 311*a* is not limited to any specific form or type and an electromagnetic valve is taken as an example in the present invention. Arranged and connected between the byproduct outlet 311 and the heat exchange tank 32 is an air blower 321, which converts thermal energy 500 in to hot or high-temperature air to be fed into the heat exchange tank 32. The heat exchange tank 32 comprises at least one exchange pipeline 322 arranged therein. The exchange pipeline 322 has an end connected to the liquefied natural gas pump 21 of the gas transportation/distribution section 20 in order to receive liquefied natural gas 400 and the hot air fed by the air blower 321 allows the liquefied natural gas 400 flowing in the exchange pipeline 322 to vaporize in order to form vaporized liquefied natural gas 800. The vaporized liquefied natural gas 800 is discharged and outputted through an out-feed pipeline 322*a* formed at an opposite end of the exchange pipeline 322. The out-feed pipeline 322*a* is connected to a first control valve 322*b* to control the output of the vaporized liquefied natural gas 800 from an output terminal 322*b*' of the first control valve 322*b*. The output terminal 322*b*' is also connected to a pressure sensor 40, to allow the pressure sensor 40 to detect the status of pressure of the output of the vaporized liquefied natural gas 800 and to detect if leaking occurs in the output of the vaporized liquefied natural gas 800. The heat exchange tank 32 is also provided with a hot gas exchange outlet 32*a*, which allows hot or high temperature gas or air inside the heat exchange tank 32 to drain out and exchange with outside air.

Arranged and connected the first control valve 322*b* and the fuel inlet 313 of the fuel cell module 31 is a second control valve 323 that controls a portion of the vaporized liquefied natural gas 800 fed back to the fuel inlet 313 of the fuel cell module 31 in order to maintain the operation of the fuel cell module 31. The first control valve 322*b* and the second control valve 323 are not limited to any specific type or form and in the present invention, anti-explosion three-way electromagnetic valves are taken as an example. The second control valve 323 is also connected to an activation tank 324. The activation tank 324 is filled in advance and stores therein an amount of vaporized liquefied natural gas 800, or alternatively, through a selectively activated switching operation of the second control valve 323, the activation tank 324 is supplied with ad thus filled with a portion of the vaporized liquefied natural gas 800 flowing out of the exchange pipeline 322 to serve as a supply of fuel for the first-time activation or for each activation operation of the fuel cell module 31. The amount of vaporized liquefied natural gas 800 stored and held in the activation tank 324 is not necessarily a large amount but is sufficient to activate the operation of the fuel cell module 31. The heat exchange tank 32 comprises therein at least one temperature sensor 325 that detects an inside temperature of the heat exchange tank 32.

At least one central management section 50 is set up on the transportation/distribution platform 10 and is connected to electrical power 700 supplied from the electrical power output terminal 314 of the fuel cell module 31 of the vaporization treatment section 30 to receive electrical power necessary for the operation thereof. The central management section 50 is not limited to any specific type or form and may comprise, as an example for illustration of the present invention, at least one detection unit 51, a central processing unit 52, an output control interface 53, a communication interface 54, and an electrical power conversion unit 55, wherein the detection unit 51 is connected to and receives detection statuses of input and vaporization of the liquefied natural gas 400 and leaking of output, vaporization temperature, and pressure of the vaporized liquefied natural gas 800 of the liquefied natural gas leak sensor 22 of the gas transportation/distribution section 20, the temperature sensor 325 of the vaporization treatment section 30, and the pressure sensor 40.

The central processing unit 52 is connected to the detection unit 51 to receive signals and data of the detection statuses of input and vaporization of liquefied natural gas 400 and leaking of output, vaporization temperature, and pressure of vaporized liquefied natural gas 800 of the liquefied natural gas leak sensor 22 of the gas transportation/distribution section 20, the temperature sensor 325 of the vaporization treatment section 30, and the pressure sensor 40 and supplies, in response to the signals and data of the detection statuses, control instructions and safety alarm signals of the input and vaporization of the liquefied natural gas 400 and leaking of the output, vaporization temperature, and pressure of the vaporized liquefied natural gas 800 associated with the gas transportation/distribution section 20 and the vaporization treatment section 30.

At least one output control interface 53 is connected to the central processing unit 52 and is also connected to the liquefied natural gas pump 21 of the gas transportation/distribution section 20 and the gas valve 311*a*, the air blower 321, the first control valve 322*b*, and the second control valve 323 of the vaporization treatment section 30 to receive the control instructions of input and vaporization of the liquefied natural gas 400 and leaking of output, vaporization temperature, water level, and pressure of the vaporized liquefied natural gas 800 supplied from the central processing unit 52 and associated with the gas transportation/distribution section 20 and the vaporization treatment section 30 and supplies operation control signals to the gas transportation/distribution section 20 and the vaporization treatment section 30.

At least one communication interface 54 is connected to the central processing unit 52 to transmit, through wired or wireless network communication modes, the signals and data of the detection statuses of input and vaporization of liquefied natural gas 400 and leaking of output, vaporization temperature, and pressure of vaporized liquefied natural gas 800 of the gas transportation/distribution section 20, the vaporization treatment section 30 and operation statuses and safety alarm signals of input and vaporization of liquefied natural gas 400 and leaking of output, vaporization temperature, water level, and pressure of vaporized liquefied natural gas 800 of the gas transportation/distribution section 20 and the vaporization treatment section 30 to at least one remote monitor and control center 910. The remote monitor and control center 910 can be a control center of a railway station or a monitor and control center of a gas company.

The electrical power conversion unit 55 is connected to the electrical power output terminal 314 of the fuel cell module 31 of the vaporization treatment section 30 to receive and convert electrical power 700 supplied from the electrical power output terminal 314 into operation powers necessary for the detection unit 51, the central processing unit 52, the output control interface 53, and the communication interface 54 to thereby supply the operation powers to the detection unit 51, the central processing unit 52, the output control interface 53, and the communication interface 54.

Figure 4:
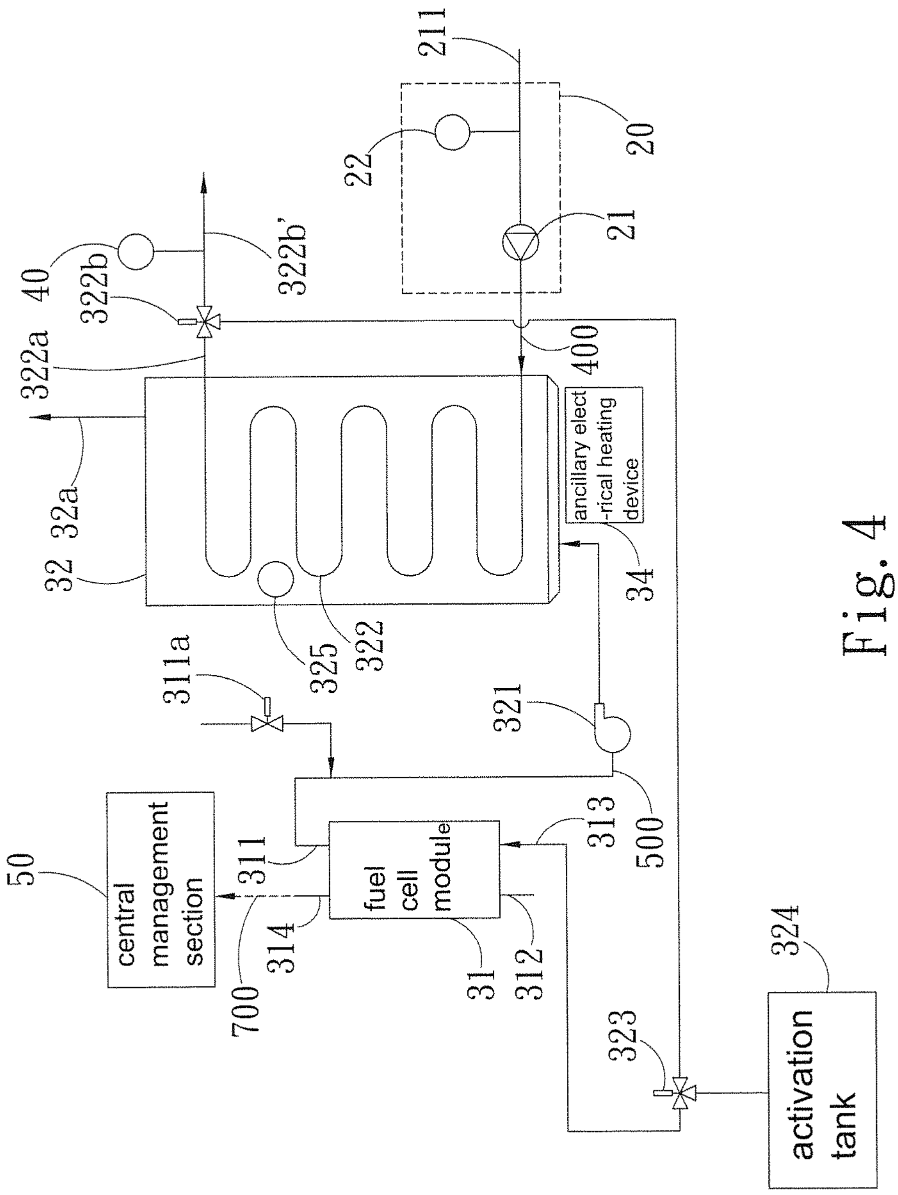
FIG. 4 is a block diagram of a second embodiment of the liquefied natural gas transportation/distribution and vaporization management system according to the present invention.
Figure 5:
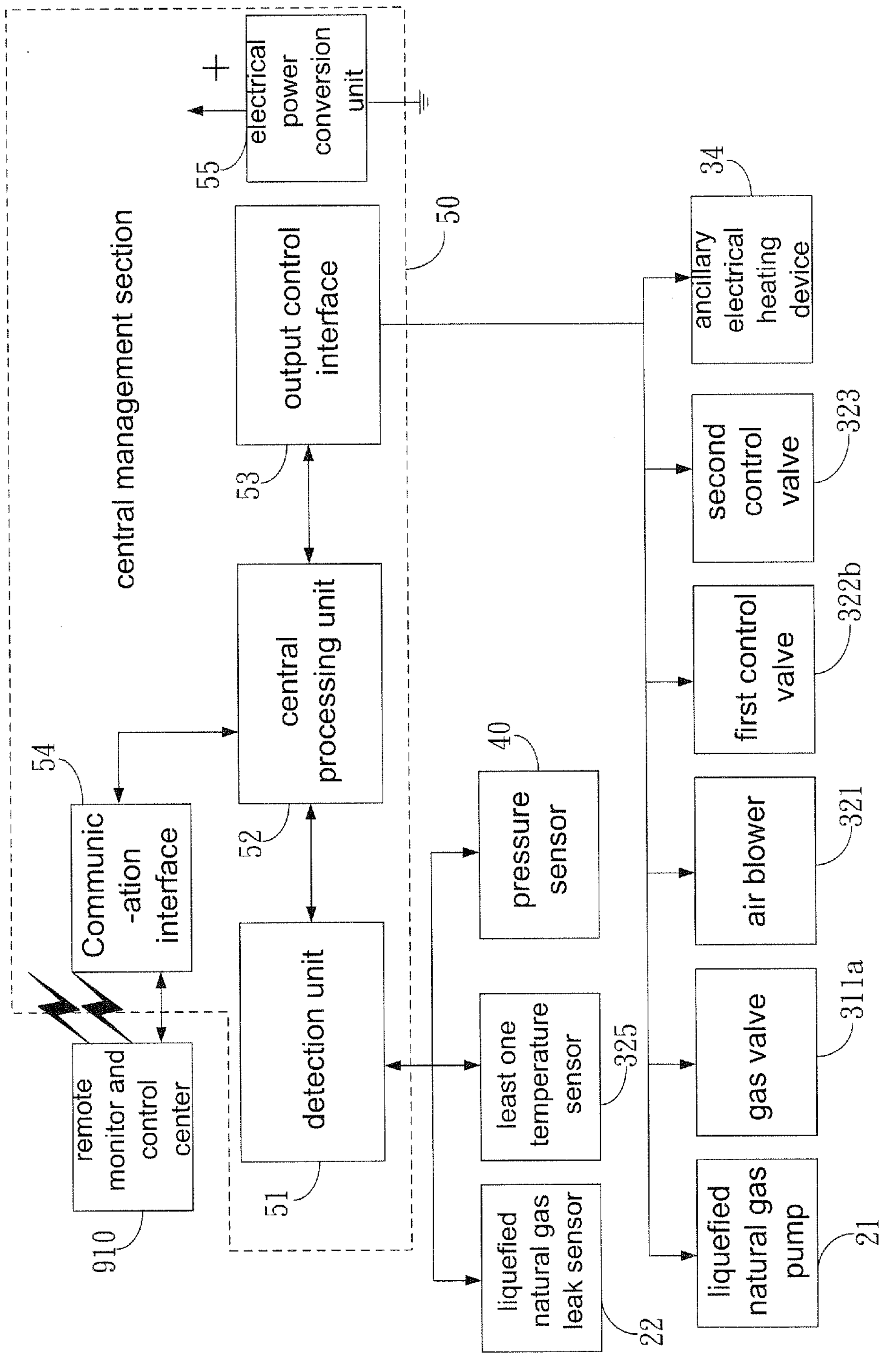
FIG. 5 is a block diagram of a central management section of FIG. 4.

Referring to FIGS. 4 and 5, a second embodiment of the liquefied natural gas transportation/distribution and vaporization management system 100 according to the present invention is illustrated, in which at least one ancillary electrical heating device 34 is arranged under or at a bottom of the heat exchange tank 32. The ancillary electrical heating device 34 is connected to the output control interface 53 of the central management section 50 (as shown in FIG. 5). When it is desired to quickly vaporize liquefied natural gas 400 flowing through the exchange pipeline 322 of the heat exchange tank 32, the central processing unit 52 of the central management section 50 activates and controls the ancillary electrical heating device 34 to generate thermal energy for heating the bottom of the heat exchange tank 32 in order to fast increase the temperature inside the heat exchange tank 32 to thereby proceed with fast heat exchange with and thus vaporization of the liquefied natural gas 400 flowing in the exchange pipeline 322.

Figure 6:
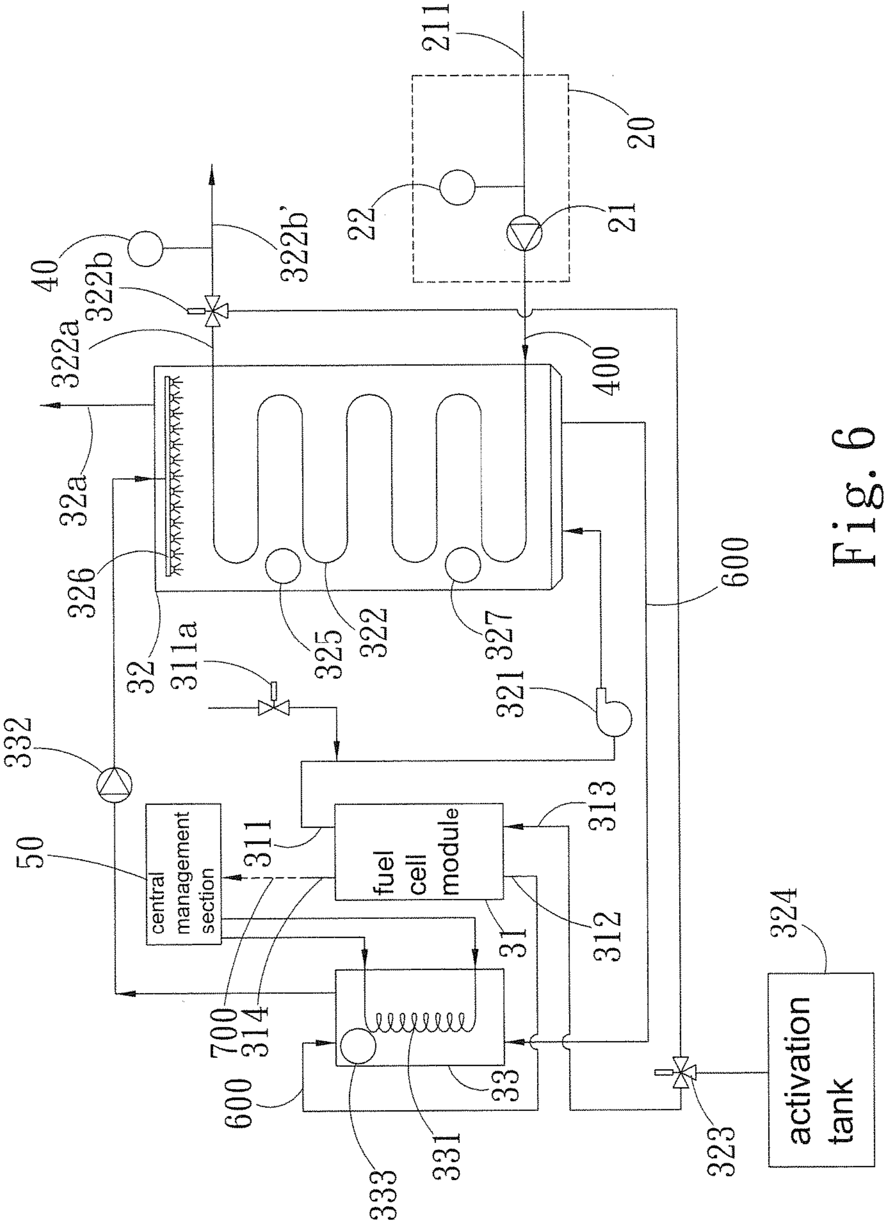
FIG. 6 is a block diagram of a third embodiment of the liquefied natural gas transportation/distribution and vaporization management system according to the present invention.
Figure 7:
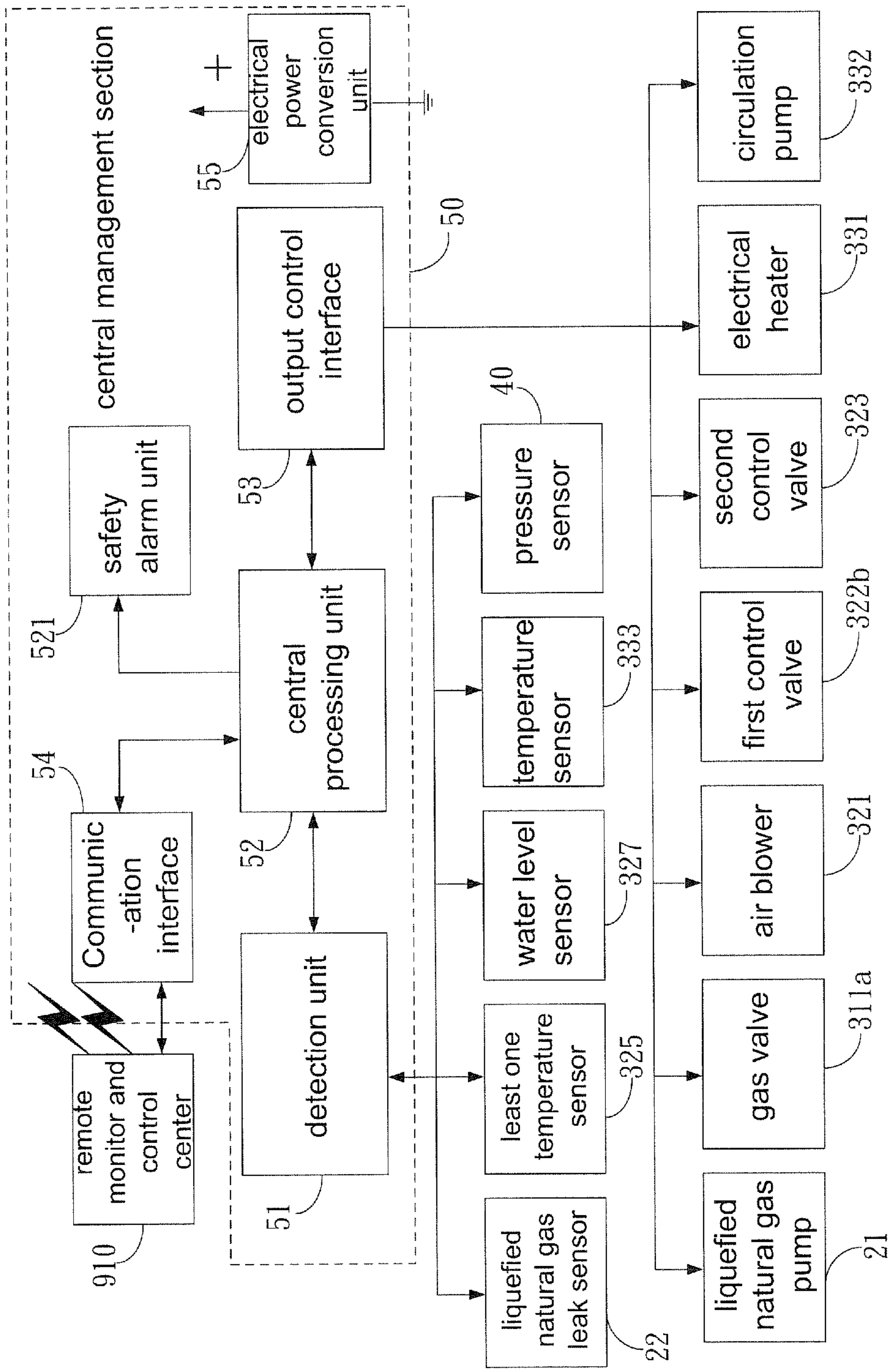
FIG. 7 is a block diagram of a central management section of FIG. 6.

Referring to FIGS. 6 and 7, a third embodiment of the liquefied natural gas transportation/distribution and vaporization management system 100 according to the present invention is illustrated, in which at least one hot water tank 33 is arranged and connected between the byproduct outlet 312 of the fuel cell module 31 of the vaporization treatment section 30 from which the byproduct of water is supplied and the heat exchange tank 32. The hot water tank 33 comprises therein at least one electrical heater 331 and a circulation pump 332. The circulation pump 332 is arranged and connected between the hot water tank 33 of the vaporization treatment section 30 and the heat exchange tank 32. The electrical heater 331 and the circulation pump 332 are connected to the output control interface 53 of the central management section 50 to be controlled by the central management section 50 for activating heating and circulation of supply of hot water so that the hot water generated in the hot water tank 33 is circulated into the heat exchange tank 32. The heat exchange tank 32 is provided therein with a water sprayer 326. The water sprayer 326 sprays the hot water from the hot water tank 32 onto a surface of the exchange pipeline 322 of the heat exchange tank 32 to supply an additional heat source to liquefied natural gas 400 flowing in the exchange pipeline 322. The heat exchange tank 32 is provided therein with a water level sensor 327. The hot water tank 33 is provided therein with at least one temperature sensor 333. The water level sensor 327 and the temperature sensor 333 are connected to the detection unit 51 of the central management section 50 to feed water level of the heat exchange tank 32 and water temperature of the hot water tank 33 to the central processing unit 52 of the central management section 50, so that the central processing unit 52 may control, via the control interface 53, the heating temperature of the electrical heater 331 and the activation (ON)/de-activation (OFF) of the circulation pump 332.

Further, the central processing unit 52 of the central management section 50 is connected to a safety alarm unit 521, so that in an event of leak or depressurization of liquefied natural gas 400 or vaporized liquefied natural gas 800, the central processing unit 52 issues a safety alarm signal to the safety alarm unit 521 to release near-site safety alarms. The safety alarm unit 521 can be constructed as a voice broadcasting device or a speaker.

Figure 8:
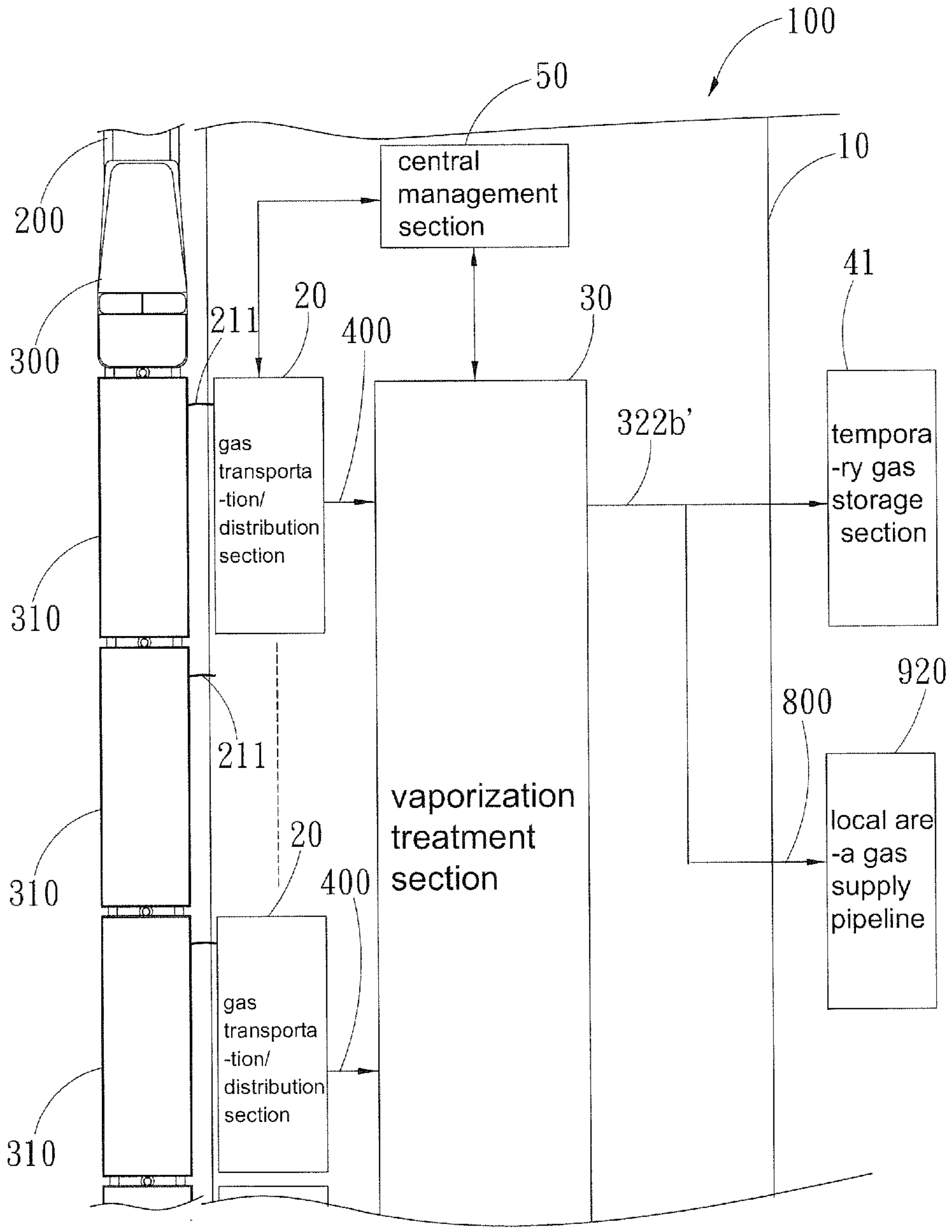
FIG. 8 is a schematic view illustrating a preferred example of application of the liquefied natural gas transportation/distribution and vaporization management system according to the present invention.
Figure 9:
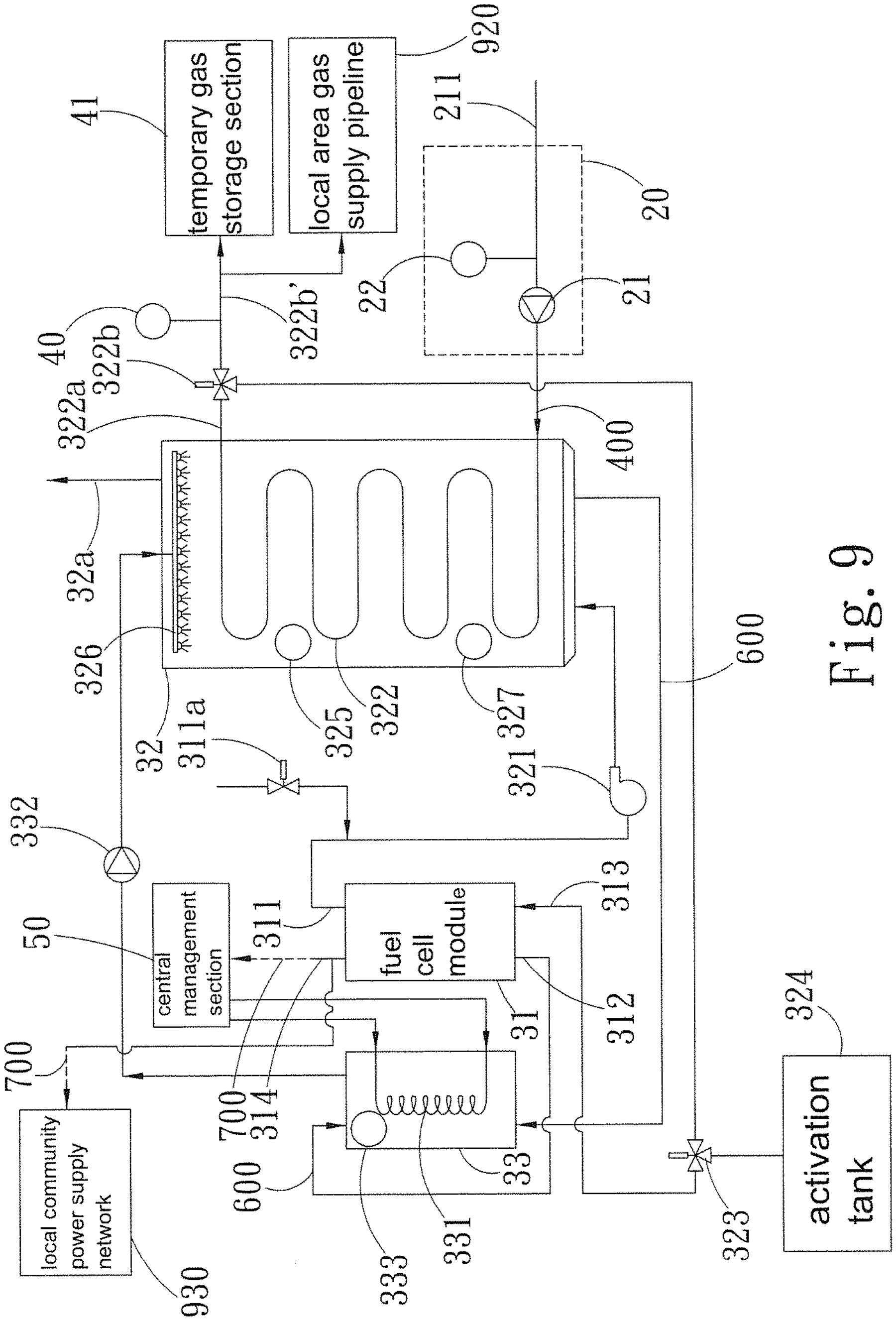
FIG. 9 is a block diagram of FIG. 8.

Referring to FIGS. 8 and 9, a preferred example of application of the liquefied natural gas transportation/distribution and vaporization management system 100 according to the present invention is illustrated, in which the output terminal 322*b*' of the first control valve 322*b* of the vaporization treatment section 30 is connected to at least one temporary gas storage section 41 and a node or an intermediate feeding point of at least one local area gas supply pipeline 920. The temporary gas storage section 41 can be a natural gas storage tank at a user side. The local area gas supply pipeline 920 can be a natural gas supply pipeline extending to local residences of communities close to the railway station or extending to gas canister filling workshop in order to directly supply natural gas to the residences of the local communities and the canister filling workshop. In addition, electrical power 700 supplied from the electrical power output terminal 314 of the fuel cell module 31 of the vaporization treatment section 30 may be supplied to at least one local community power supply network 930 as a backup power source or a non-interrupted power supply system, or may alternatively be supplied as a charging source for electrically operated transportation vehicles, such as electrical vehicles, in the neighborhood of the railway station.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A liquefied natural gas transportation/distribution and vaporization management system, comprising:

a transportation/distribution platform;

at least one gas transportation/distribution section, which is arranged on at least one side of the transportation/distribution platform that is close to a railway adapted to allow at least one liquefied natural gas transportation train to unload liquefied natural gas through an infeed pipeline;

at least one vaporization treatment section, which is arranged on the transportation/distribution platform and is connected to the gas transportation/distribution section to receive the liquefied natural gas, the vaporization treatment section comprising at least one solid oxide fuel cell module and at least one heat exchange tank, the at least one solid oxide fuel cell module including a first byproduct outlet for a byproduct of thermal energy, a second byproduct outlet of water, a fuel inlet, and an electrical power output terminal, the first and second byproduct outlets being fluidly coupled to the heat exchange tank, at least one hot water tank being arranged and connected between the second byproduct outlet and the heat exchange tank, the hot water tank including at least one electrical heater arranged therein, the heat exchange tank having at least one exchange pipeline therein, the exchange pipeline having an end connected to and receiving the liquefied natural gas from the gas transportation/distribution section for heat exchange with the byproduct of thermal energy and water generated in a power generation operation of the at least one solid oxide fuel cell module so as to generate vaporized liquefied natural gas, an out-feed pipeline being formed at an opposite end of the exchange pipeline to output the vaporized liquefied natural gas, a portion of the vaporized liquefied natural gas outputted from the out-feed pipeline being fed back to the fuel inlet of the at least one solid oxide fuel cell module; and at least one central management section, which is arranged on the transportation/distribution platform and is connected to and receive electrical power from the electrical power output terminal of the at least one solid oxide fuel cell module of the vaporization treatment section and is connected to and controls transportation/distribution, vaporization of the liquefied natural gas and management, monitoring, and control of temporary storage of vaporized natural of the gas transportation/distribution section, the vaporization treatment section, and a temporary gas storage section, wherein the electrical heater of the hot water tank is connected to the central management section to be controlled and activated by the central management section to generate hot water in the hot water tank for supplying to the heat exchange tank, the heat exchange tank including a water sprayer arranged therein, the water sprayer spraying the hot water from the hot water tank onto a surface of the exchange pipeline of the heat exchange tank.

2. The liquefied natural gas transportation/distribution and vaporization management system as claimed in claim 1, wherein the gas transportation/distribution section includes a liquefied natural gas pump arranged therein, the liquefied natural gas pump being connected to the central management section to be activated and controlled by the central management section to supply assistance to input of the liquefied natural gas.

3. The liquefied natural gas transportation/distribution and vaporization management system as claimed in claim 1, wherein the gas transportation/distribution section includes a liquefied natural gas leak sensor coupled to the infeed pipeline, the liquefied natural gas leak sensor being connected to the central management section to feed leak detection status of the liquefied natural gas of the gas transportation/distribution section back to the central management section.

4. The liquefied natural gas transportation/distribution and vaporization management system as claimed in claim 1, wherein at least one air blower is arranged and connected between the first byproduct outlet of of the at least one solid oxide fuel cell module of the vaporization treatment section and the heat exchange tank, the air blower being controlled and activated by the central management section to force hot gas into the heat exchange tank.

5. The liquefied natural gas transportation/distribution and vaporization management system as claimed in claim 1, wherein the heat exchange tank of the vaporization treatment section includes a hot gas exchange outlet to allow hot gas from the heat exchange tank to vent to ambient air.

6. The liquefied natural gas transportation/distribution and vaporization management system as claimed in claim 1, wherein the first byproduct outlet of the at least one solid oxide fuel cell module of the vaporization treatment section includes at least one gas valve, the gas valve being controlled by the central management section for opening/closing to control communication with outside atmosphere.

7. The liquefied natural gas transportation/distribution and vaporization management system as claimed in claim 1 wherein at least one circulation pump is arranged and connected between the hot water tank of the vaporization treatment section and the heat exchange tank, the circulation pump being controlled and activated by the central management section to generate circulation of hot water supplied to the heat exchange tank.

8. The liquefied natural gas transportation/distribution and vaporization management system as claimed in claim 1, wherein the hot water tank of the vaporization treatment section includes at least one temperature sensor arranged therein, the temperature sensor being connected to the central management section to feed water temperature of the hot water tank back to the central management section.

9. The liquefied natural gas transportation/distribution and vaporization management system as claimed in claim 1, wherein the heat exchange tank of the vaporization treatment section includes at least one temperature sensor and a water level sensor arranged therein, the temperature sensor and the water level sensor being connected to the central management section to feed temperature and water level of the heat exchange tank back to the central management section.

10. The liquefied natural gas transportation/distribution and vaporization management system as claimed in claim 1, wherein the out-feed pipeline of one end of the exchange pipeline of the heat exchange tank of the vaporization treatment section is connected to a first control valve, a second control valve being arranged and connected between the first control valve and the fuel inlet of the at least one solid oxide fuel cell module of the vaporization treatment section, the first control valve and the second control valve being controlled by the central management section to control feeding of the vaporized liquefied natural gas to the at least one solid oxide fuel cell module.

11. The liquefied natural gas transportation/distribution and vaporization management system as claimed in claim 10, wherein the first control valve has an output terminal that is connected to a pressure sensor, the pressure sensor being connected to the central management section to feed a detection status of pressure of the vaporized liquefied natural gas supplied from the output terminal of the first control valve back to the central management section.

12. The liquefied natural gas transportation/distribution and vaporization management system as claimed in claim 10, wherein the second control valve is connected to an activation tank.

13. The liquefied natural gas transportation/distribution and vaporization management system as claimed in claim 1, wherein the out-feed pipeline of one end of the exchange pipeline of the heat exchange tank of the vaporization treatment section is connected to at least one temporary gas storage section.

14. The liquefied natural gas transportation/distribution and vaporization management system as claimed in claim 1, wherein the out-feed pipeline of one end of the exchange pipeline of the heat exchange tank of the vaporization treatment section is connected to at least one local area gas supply pipeline.

15. The liquefied natural gas transportation/distribution and vaporization management system as claimed in claim 1, wherein an ancillary electrical heating device is arranged at a bottom of the heat exchange tank of the vaporization treatment section, the ancillary electrical heating device being connected to the central management section to be controlled and activated by the central management section to supply thermal energy for assisting heating to the heat exchange tank.

16. A liquefied natural gas transportation/distribution vaporization management system, comprising:

a transportation/distribution platform;

at least one gas transportation/distribution section, which is arranged on at least one side of the transportation/distribution platform that is close to a railway adapted to allow at least one liquefied natural gas transportation train to unload liquefied natural gas through an infeed pipeline;

at least one vaporization treatment section, which is arranged on the transportation/distribution platform and is connected to the gas transportation/distribution section to receive the liquefied natural gas, the vaporization treatment section comprising at least one solid oxide fuel cell module and at least one heat exchange tank, the at least one solid oxide fuel cell module including at least one byproduct outlet for a byproduct of thermal energy or water, a fuel inlet, and an electrical power output terminal, the at least one byproduct outlet of thermal energy or water being connected to the heat exchange tank, the heat exchange tank having at least one exchange pipeline therein, the exchange pipeline having an end connected to and receiving the liquefied natural gas from the gas transportation/distribution section for heat exchange with the at least one byproduct of thermal energy or water generated in a power generation operation of the at least one solid oxide fuel cell module so as to generate vaporized liquefied natural gas, an out-feed pipeline being formed at an opposite end of the exchange pipeline to output the vaporized liquefied natural gas, a portion of the vaporized liquefied natural gas outputted from the out-feed pipeline being fed back to the fuel inlet of the fuel cell module; and at least one central management section, which is arranged on the transportation/distribution platform and is connected to and receive electrical power from the electrical power output terminal of the at least one solid oxide fuel cell module of the vaporization treatment section and is connected to and controls transportation/distribution, vaporization of the liquefied natural gas and management, monitoring, and control of temporary storage of vaporized natural of the gas transportation/distribution section, the vaporization treatment section, and a temporary gas storage section, the central management section including:

at least one detection unit, which is connected to and detects statuses of input and vaporization of the liquefied natural gas supplied to the gas transportation/distribution section and the vaporization treatment section and leaking of output, vaporization temperature, water level, and pressure of the vaporized liquefied natural gas;

at least one central processing unit, which is connected to the detection unit to receive signals and data of the detection statuses of input and vaporization of the liquefied natural gas supplied to the gas transportation/distribution section and the vaporization treatment section and leaking of output, vaporization temperature, water level, and pressure of the vaporized liquefied natural gas and to supply, in response to the signals and data of the detection statuses, outputs control instructions and safety alarm signals corresponding to input and vaporization of the liquefied natural gas supplied to the gas transportation/distribution section and the vaporization treatment section and leaking of output, vaporization temperature, water level, and pressure of the vaporized liquefied natural gas;

at least one output control interface, which is connected to the central processing unit and is connected to the gas transportation/distribution section and the vaporization treatment section to receive the control instructions output from the central processing unit and corresponding to input and vaporization of the liquefied natural gas supplied to the gas transportation/distribution section and the vaporization treatment section and leaking of output, vaporization temperature, water level, and pressure of the vaporized liquefied natural gas associated with the gas transportation/distribution section and the vaporization treatment section and to supply corresponding operation control signals to the gas transportation/distribution section and the vaporization treatment section;

at least one communication interface, which is connected to the central processing unit to transmit, via a wired or wireless communication mode, the signals and data of the detection statuses of input and vaporization of the liquefied natural gas supplied to the gas transportation/distribution section and the vaporization treatment section and leaking of output, vaporization temperature, water level, and pressure of the vaporized liquefied natural gas and the operation statuses and the safety alarm signals of input and vaporization of the liquefied natural gas supplied to the gas transportation/distribution section and the vaporization treatment section and leaking of output, vaporization temperature, water level, and pressure of the vaporized liquefied natural gas to at least one remote monitor and control center; and at least one electrical power conversion unit, which is connected to the electrical power output terminal of the at least one solid oxide fuel cell module of the vaporization treatment section to receive and convert electrical power supplied from the electrical power output terminal into operation powers necessary for the detection unit, the central processing unit, the output control interface, and the communication interface in order to supply the operation powers to the detection unit, the central processing unit, the output control interface, and the communication interface.

17. The liquefied natural gas transportation/distribution and vaporization management system as claimed in claim 16, wherein the central processing unit is connected to a safety alarm unit and outputs the safety alarm signals thereto for issuing a near-site safety alarm.

* * * * *